(12) United States Patent
Blendea

(10) Patent No.: US 7,080,572 B2
(45) Date of Patent: Jul. 25, 2006

(54) MECHANICAL FUSE AND METHOD OF USE

(75) Inventor: Horia Blendea, LaSalle (CA)

(73) Assignee: L&P Property Management Company, South Gate, CA (US)

( * ) Notice: Subject to any disclaimer, the term of this patent is extended or adjusted under 35 U.S.C. 154(b) by 367 days.

(21) Appl. No.: 10/414,868

(22) Filed: Apr. 16, 2003

(65) Prior Publication Data

US 2004/0206200 A1    Oct. 21, 2004

(51) Int. Cl.
*F16C 1/10*    (2006.01)

(52) U.S. Cl. .......................................... 74/502.6; 403/2

(58) Field of Classification Search ............. 74/502.4, 74/502.6; 403/2, 41, 78, 79
See application file for complete search history.

(56) References Cited

U.S. PATENT DOCUMENTS

| | | | | |
|---|---|---|---|---|
| 4,330,926 A | * | 5/1982 | McCall | 29/525.01 |
| 4,755,632 A | * | 7/1988 | Pelet et al. | 174/70 S |
| 6,007,267 A | * | 12/1999 | VanHorn | 403/2 |
| 6,668,680 B1 | * | 12/2003 | Freund et al. | 74/512 |
| 6,763,740 B1 | * | 7/2004 | Ose | 74/500.5 |

* cited by examiner

*Primary Examiner*—Chong H. Kim
(74) *Attorney, Agent, or Firm*—Grant D. Kang; Dennis J.M. Donahue, III; Husch & Eppenberger LLC

(57) ABSTRACT

A mechanical fuse is used with ergonomic devices for seats such as automobile seats to allow the ergonomic devices to tolerate abusive loads without breaking a linkage, such as a traction cable, used to move the ergonomic supports. The traction cable is comprised of a sleeve with a wire disposed to slide axially through the sleeve. The mechanical fuse is installed with the sleeve divided into two sections, with an end of each section seated into a male component or a female component of the mechanical fuse. The male and female components of the mechanical fuse slide axially relative to one another but are restrained from sliding by insertion of a boss on one component into a detent on the other component. The boss and detent hold the male and female components together in a friction fit that resists axial movement. When an abusive force is applied to the fuse, the friction fit of the boss and detent is overcome so that the boss slides out of the detent in a radial direction. Once released, the male and female components slide axially into one another, shortening the overall distance of the traction cable sleeve until the abusive load is released so that the traction cable sleeves can resume their originally selected relative spacing. The friction fit is maintained by the compressive biasing of an external spring. The compressive force is resisted, and the fuse is reset, by the expansive force of an internal spring.

23 Claims, 5 Drawing Sheets

MECHANICAL FUSE AND METHOD OF USE

CROSS-REFERENCE TO RELATED APPLICATIONS

None.

STATEMENT REGARDING FEDERALLY SPONSORED RESEARCH OR DEVELOPMENT

Not Applicable.

APPENDIX

Not Applicable.

BACKGROUND OF THE INVENTION

1. Field of the Invention

This invention relates generally to ergonomic supports for seats, especially automobile seats.

2. Related Art

A certain percentage of seats, especially automobile seats, will be subject to abusive loads in the course of their useful life. Abusive loads may be caused by light or heavy automobile accidents, misuse by the seat occupant, sudden, violent or unexpected movement by the seat occupant or the placing of overweight items on the seat. A wide variety of moveable components are installed in seats to provide ergonomic support for the occupants of those seats. By way of example, U.S. Pat. No. 6,536,840 B1 to Schuster is incorporated by reference herein. Because such ergonomic supports are typically mass produced, production costs are often controlled by manufacturers by using the least expensive, and usually therefore the lightest, component adequate to meet expected design loads, such as the ordinary weight of a seated passenger. Ergonomic supports constructed of components that are sufficiently heavy to tolerate abusive loads as well as ordinary loads are disadvantageously expensive. There is a need in the art for a system to protect the ergonomic support from damage caused by overloads while maintaining the ability to manufacture the ergonomic support from economical components.

By and large, ergonomic supports in seats move. Movement is usually achieved by an actuator such as a hand crank or an electrical motor, which is connected to the moving parts of the ergonomic support via a linkage. The linkage may be made of rigid components such as rods, spokes or hard drawn wire. More frequently, however, the linkage takes the form of a traction cable called a Bowden cable. The bowden cable is comprised of a sleeve or conduit with a wire disposed to slide axially through the sleeve. One end of the bowden cable is attached to an actuator, and the other end is attached to the ergonomic support, such as a lumbar support. The actuator moves the wire relative to the sleeve, usually by pulling the wire out from the sleeve. An example of an actuator is found in U.S. Pat. No. 5,638,722 to Klingler which is incorporated by reference herein. The relative movement of the sleeve and wire on one end obviously moves the other end of the wire relative to the other end of the sleeve. Accordingly, one part of a moving lumbar support is attached to the end of the wire, and another part of the ergonomic support's moving parts is attached to the end of the sleeve. For example, some lumbar supports are comprised of a flexible arching panel mounted on rails. The traction cable sleeve is attached to either the top or the bottom of the panel, and the wire is attached to the other end. Thus, when the actuator pulls the wire through the sleeve, the two ends of the panel are pulled together and it arches outwards towards the seat occupant, providing an arched lumbar support for the occupant.

In the case of ergonomic supports comprised of moving components that are actuated by a traction cable, the linkage of the cable components to the moving parts is likely to be damaged in the event an abusive load is placed on the components. Accordingly, there is a particular need in the art for a system capable of being assembled with a traction cable linkage that protects components from damage from abusive loads.

SUMMARY OF THE INVENTION

The present invention is a system method and apparatus for protecting ergonomic supports for seats from abusive loads. The present system, which may be referred to as a "mechanical fuse," is designed to be installed in series with a traction cable, rigid rod or other type of actuation linkage.

The device of the present invention is comprised of a first cylindrical component engaged with a second cylindrical component, and in axially sliding communication with it. A first one of the cylindrical components engages a first portion of a traction cable sleeve. The other one of the cylindrical components engages a second portion of a traction cable sleeve. Alternatively, one of the cylindrical components may engage the structure of the lumbar system or the actuator. In another alternative, both cylinders may engage rigid rods.

The sliding axial communication of the first and second cylindrical components is designed to retain the relative axial position of the two components relative to one another through a certain preconfigured range of axial load. The cylindrical components slide axially relative to one another in the event that the axial load increases to a level greater than a preconfigured threshold. The traction cable wire proceeds axially through both cylindrical components.

Accordingly, when an abusive load is put on the ergonomic support, that load is transferred to the traction cable. The mechanical fuse of the present invention absorbs the abusive load by releasing the added tension on the traction cable sleeve when it lengthens the relative distance between the sleeve end and the wire end or shortens the distance between the cable sleeves (or rods) by allowing the cylindrical components to slide axially over one another.

The mechanical fuse of the present invention resets to re-establish the length and tension adjustment of the traction cable maintained before the abusive load occurred with an internal expansion spring. When an abusive load compresses the cylindrical components relative to one another along the axis of the traction cable, the expansion spring within them is also compressed. When the abusive load is released, the expansion spring pushes the cylindrical components back apart, returning them to their original position.

The engagement of the two cylindrical components may be with any of a variety of bosses and detents, tabs and slots or, in one embodiment, a sectioned collar and interrupted annular groove engagement. The collar and annular groove have cooperating faces held together by integral bias and, optionally, with a compression spring.

BRIEF DESCRIPTION OF THE DRAWINGS

The accompanying drawings, which are incorporated in and form a part of the specification, illustrate the embodiments of the present invention and together with the description, serve to explain the principles of the invention. In the drawings.

DETAILED DESCRIPTION OF THE PREFERRED EMBODIMENTS

Figure 1:
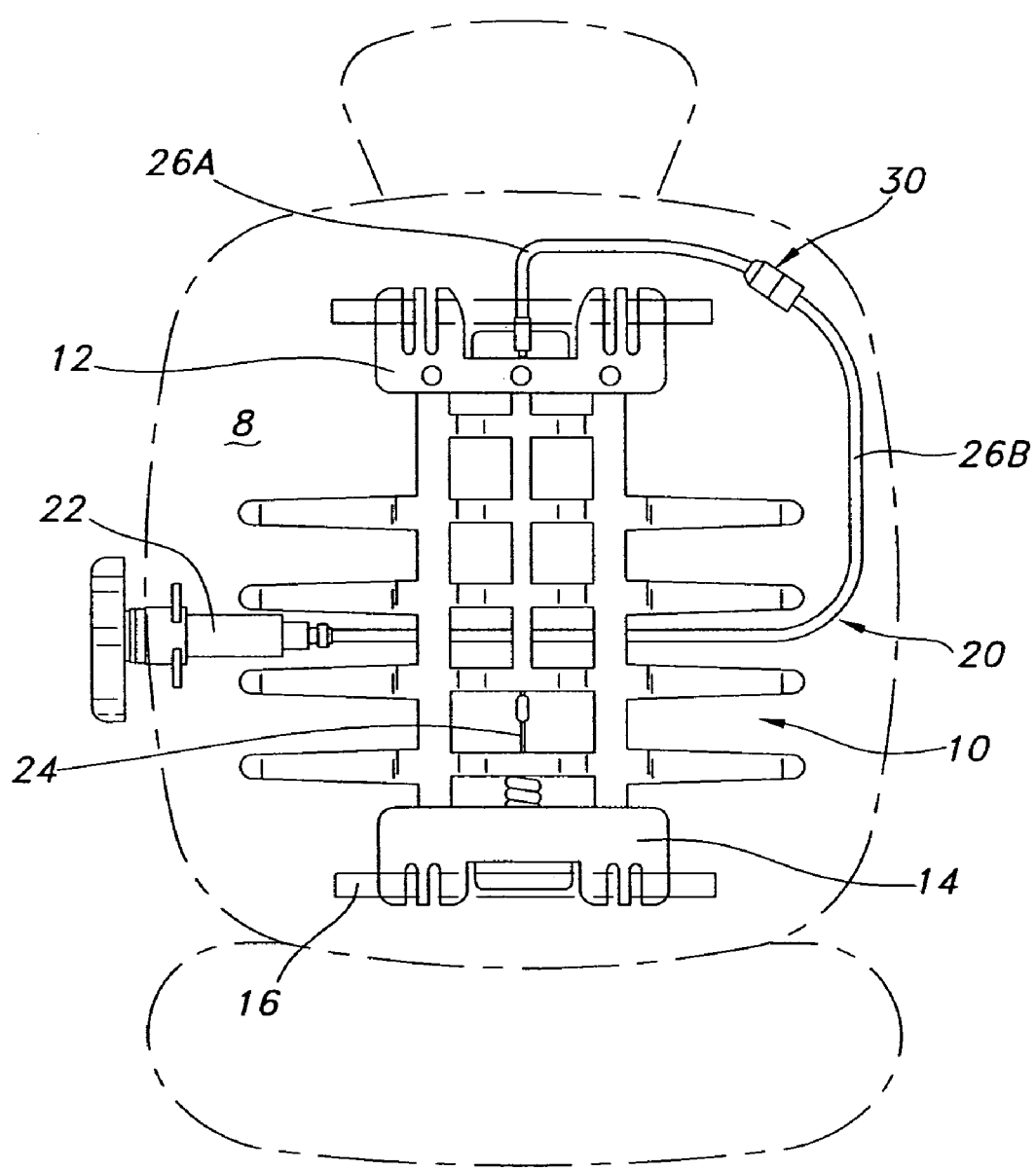
FIG. 1 is an illustration of a lumbar support actuated by a traction cable and including the mechanical fuse of the present invention.

Referring to the accompanying drawings in which like reference numbers indicate like elements, FIG. 1 illustrates a lumbar support actuated by an actuation linkage that is a traction cable. In a seat 8, an arching pressure surface 10 may be bowed or arched outwards to form a semi-rigid curve offering lumbar support to a seat passenger. The pressure surface 10 has an upper-end 12 and a lower-end 14. The ends of the pressure surface are engaged with guide rods (obscured) along which they slide when the pressure surface 10 is arched. The guide rods in turn are attached to a frame of the seat 8 by mounts 16.

Arching force is applied to the pressure surface by traction cable 20. One end of the traction cable 20 is engaged with an actuator 22. The engagement is designed such that movement of the actuator, as by a human handcrank or an electrical motor, will pull a traction cable wire 24 axially through and out from the traction cable sleeve 26.

The other end of the traction cable 20 is engaged with the arching pressure surface 10. Specifically, the sleeve 26 is attached to the top end 12 of the arching pressure surface. The traction cable wire 24 is attached to the bottom end 14 of the arching pressure surface. Accordingly, as the actuator 22 pulls the wire 24 out from the sleeve 26 at the actuator end, the lumbar support end of wire 24 will be pulled closer to the lumbar support end of the sleeve 26, thus drawing the bottom end 14 to which the wire is attached and the top end 12 to which the sleeve is attached closer together.

As will be immediately appreciated by those with skill in the art, the arched, lumbar supporting position of the flexible panel 10 is maintained by a degree of tension held in place by the traction cable 20. (Tension is held by any of a variety of locks, brakes or clutches usually incorporated in the actuators.) As will further be appreciated by those with skill in the art, an abusive load, comprised of force against the arching pressure surface 10 in a direction to flatten it, will impose a force on the traction cable pulling the traction cable wire 24 out from the traction cable sleeve 26 at the lumbar support end (and pulling the wire 24 into the sleeve 26 at the actuator 22 end). An abusive load will be received by the mechanical fuse as a compressive axial force. When a load is heavy enough, sudden enough or otherwise violent enough to exceed the expected design limit of the lumbar support, this abusive load risks damage to the lumbar support, particularly at its traction cable linkage.

The fuse 30 divides the sleeve into sections 26A and 26B. The wire 24 proceeds through the fuse 30 without interruption.

In a similar fashion, rigid links may also draw the top and bottom ends together. See, for example, U.S. Pat. No. 5,397,164, which is hereby incorporated by reference herein. Any of a wide variety of actuation linkages may have the mechanical fuse advantageously installed, provided the linkage allows for a selectable positioning of the ergonomic support, and receives abusive loads as a compressive force along the axis of the linkage.

Figure 2:
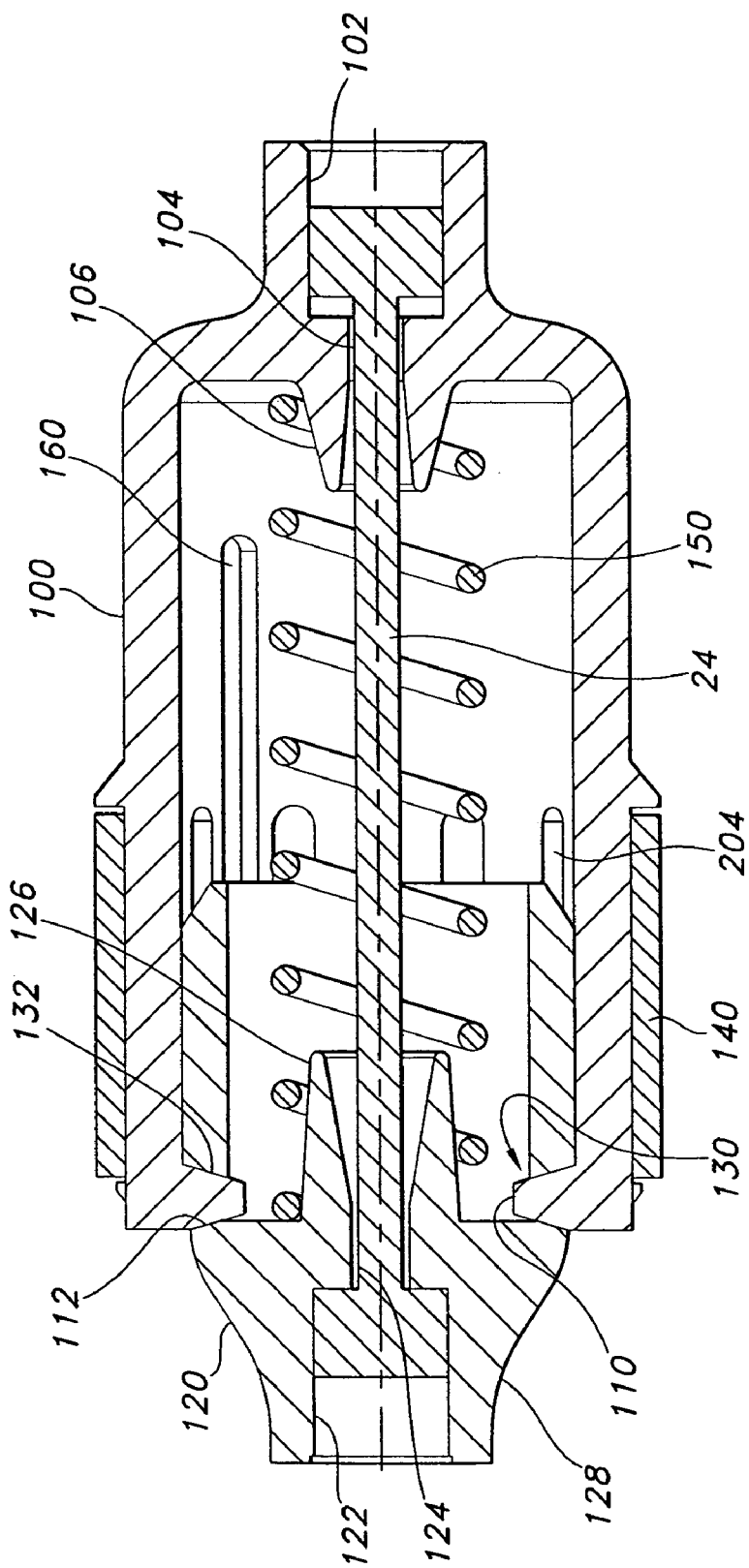
FIG. 2 is a cross-section of the mechanical fuse of the present invention.

FIG. 2 is a cross-section of the mechanical fuse of the present invention. First cylindrical component 100 has a seat 102 for one section of a traction cable sleeve. First cylindrical component 100 also has an axial through hole 104 for allowing passage therethrough of the traction cable wire 24. Annular to the through hole 104 is a spring seat 106 for internal spring 150.

At the other end of first cylindrical component 100 has a collar 110 or a series of bosses or tabs. The collar has angled faces 112. The collar is in sections, as described below.

The second cylindrical component 120 also has a seat 122 for a different traction cable sleeve section, or a different rod or other actuation linkage component. The second cylindrical component 120 also has an axial through hole 124 for allowing passage therethrough of the traction cable wire 24. Concentric to this through hole 124 is an annular seat 126 for internal spring 150.

The second cylindrical component 120 also has a groove 130, or, alternatively, a series of holes, detents or slots. Groove 130 is positioned and dimensioned to engage collar 110 on the first cylindrical component 100. Annular groove 130 has angled faces 132. The angled faces 132 of annular groove 130 are dimensioned to correspond and closely cooperate with the oppositely angled faces 112 of the first cylindrical component 110 of the collar. When assembled, the faces 132 and 112 form a friction fit.

Internal to both cylindrical components 100 and 120 is the expansion spring 150. Expansion spring 150 is seated at either end on each of the annular spring seats 106 and 126.

Outside of the first cylindrical component 100 is a compression spring 140. A metal C-spring may be used, or, alternatively, an O-ring, which may be softer than the C-spring.

Figure 3:
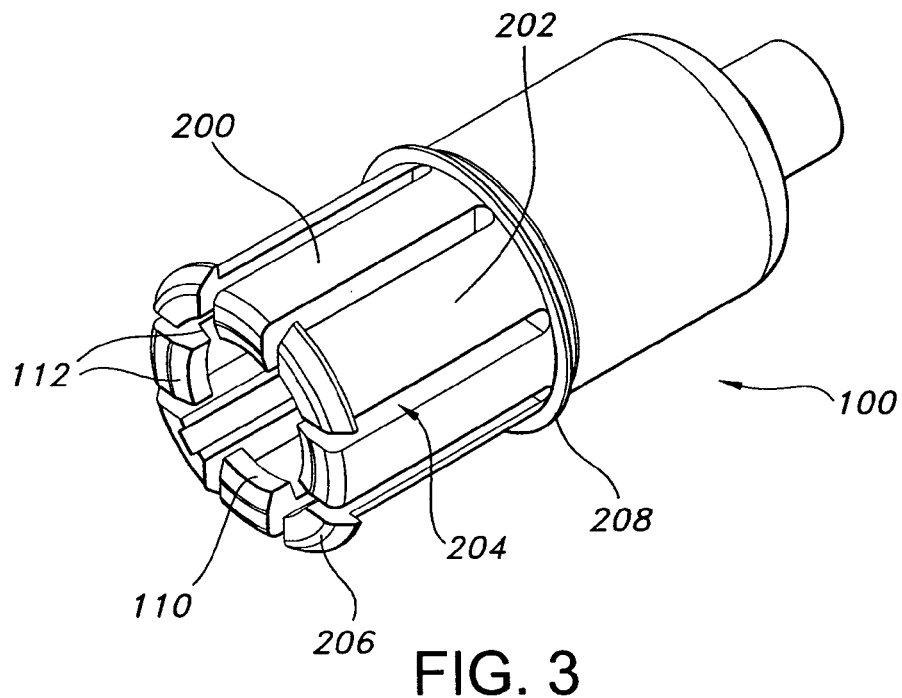
FIG. 3 is a perspective view of the mechanical fuse, unassembled.
Figure 4:
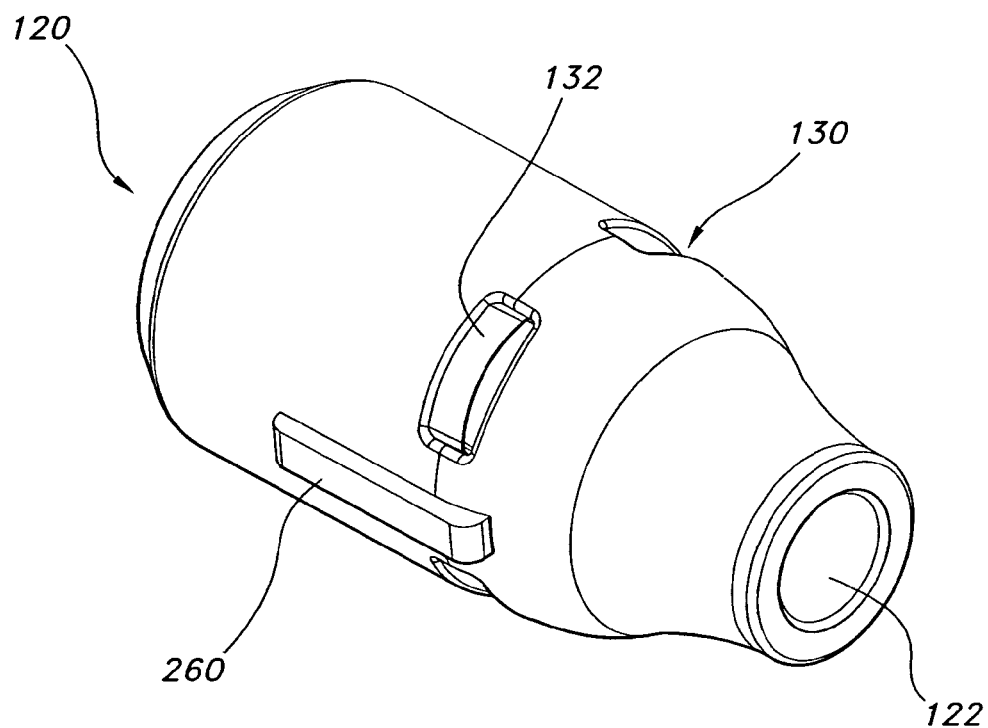
FIG. 4 is a perspective view of the mechanical fuse, unassembled.
Figure 5:
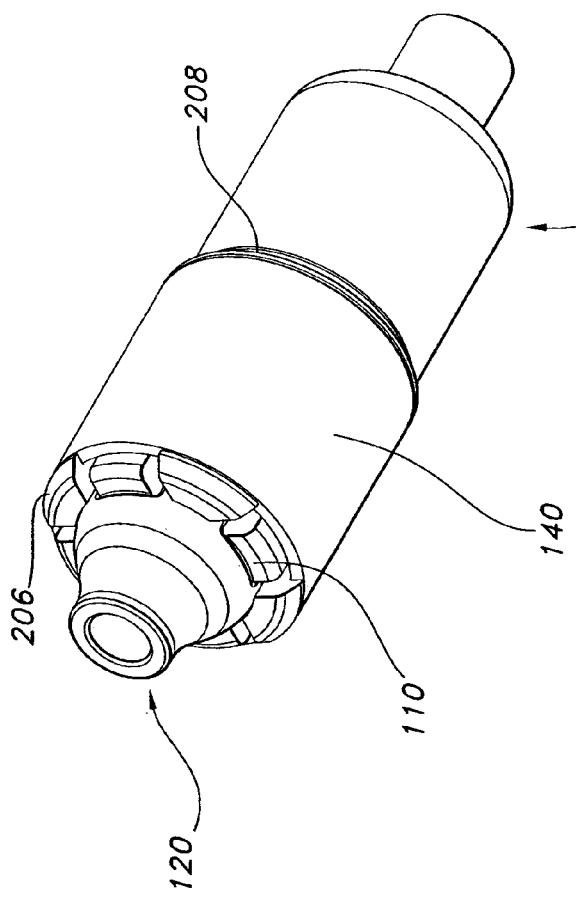
FIG. 5 is a perspective view of the mechanical fuse.

FIGS. 3 and 4 are perspective views of the cylindrical components 100 and 120 of the mechanical fuse unassembled. FIG. 5 is a perspective view of the assembled mechanical fuse. As is best seen in FIG. 3, one alternative embodiment of the flexing "collar" 110 is comprised of a series of axially oriented fingers that flex in a radial direction 200. Collar 110 is actually in four sections, each of the sections being a free end of a finger 200. In other words, each finger 200 has an inwardly oriented boss or tab. Fingers 200 alternate with non-flexing fingers 202, which have no inwardly oriented collar projection. All of the fingers 200 and 202 are separated by slots 204. Fingers 202 do not have an inwardly projecting collar component 110. Rather, fingers 202 have an outwardly projecting flange 206 which along with flange 208 retain C-spring 140 when assembled.

Visible in FIG. 4 on the second cylindrical or male component 120 are the circumferential holes or groove 130 sections that interact with the sectioned collar components 110 of Fingers 200. Holes 130 are defined by faces including face 132 molded in component 120. Angled face 132 in hole 130, as was illustrated in FIG. 2, is dimensioned to closely cooperate with the angled faces 112 of collar sections 110. Fingers 200 are naturally biased by their integral forming, as by plastic molding, to a position parallel with the axis of the cylinders 100 and 120 and the traction wire 24. Accordingly, when so assembled collar sections 110 snap into holes 130, establishing a friction fit between the faces 112 of collar sections 110 and the faces 132 of holes 130.

Also visible on FIG. 4 is an anti-rotation ridge 260 dimensioned to closely cooperate with an anti-rotation groove 160 inside cylindrical component 100. The groove 160 is best seen in FIG. 2.

FIG. 5 is a perspective view of the assembled components showing the snap fit insertion of collar sections 110 in holes 130 and the retention of C-spring 140 by flanges 206 and 208.

As will be apparent to those with skill in the art, any of a variety of alternative embodiments can achieve the functional interaction of components 100 and 120 that is required. Tabs and slots, bosses and detents, even a 360 degree collar interacting with a 360 degree groove (that is not a through-hole) will serve to achieve the releasable friction fit of the fuse and are considered to be within the scope of the present invention.

In assembly, a traction cable wire is inserted all the way through the mechanical fuse, through axial through holes 104 and 124 and through spring 150. Traction cable sleeve segment such as segment, 26A or 26B is seated at either seat 102 or 122. The other traction cable sleeve segment 26B or 26A is seated in the other sleeve seat. Alternatively, a bullet or cylindrical collar on the traction cable wire 24 may be seated opposite a sleeve segment. The spring, 150 is installed over the wire 24 until it is mounted against one or the other of the annular seats 106 or 126. The cylindrical components 100 and 120 are slid in a male-female fashion into one another. One or both of the cylindrical components are flexible enough so that the first cylindrical component collar 110 may be slidingly installed over the side walls of second cylindrical component 120. When the collar 110 reaches the groove 130, it snaps into place. The collar and groove may be 360°, less than 360° or divided into circumferential sections. The dimensions, especially the length, of the cylindrical components and their collar 110 and groove 130 are dimensioned to correspond to a pre-configured range of motion for the traction cable.

In the depicted embodiment, a compression spring 140 in the form of a collar is snapped into place over the first cylindrical component 100 in order to supplement the natural bias of the first cylindrical component to hold the collar 10 seated in the groove 130. Alternatively, the compression spring 140 may be omitted if the natural bias of the first cylindrical portion to remain seated is sufficient for the anticipated loads.

After the mechanical fuse has been installed in series with a traction cable, rods or other actuation linkage and assembled, the traction cable itself may be linked to an actuator and an ergonomic support.

Although the depicted embodiment is cylindrical, the scope of the present invention includes sliding components like 100 and 120 with varying cross sections, including without limitation, square, flat, oval and the like.

Figure 7:
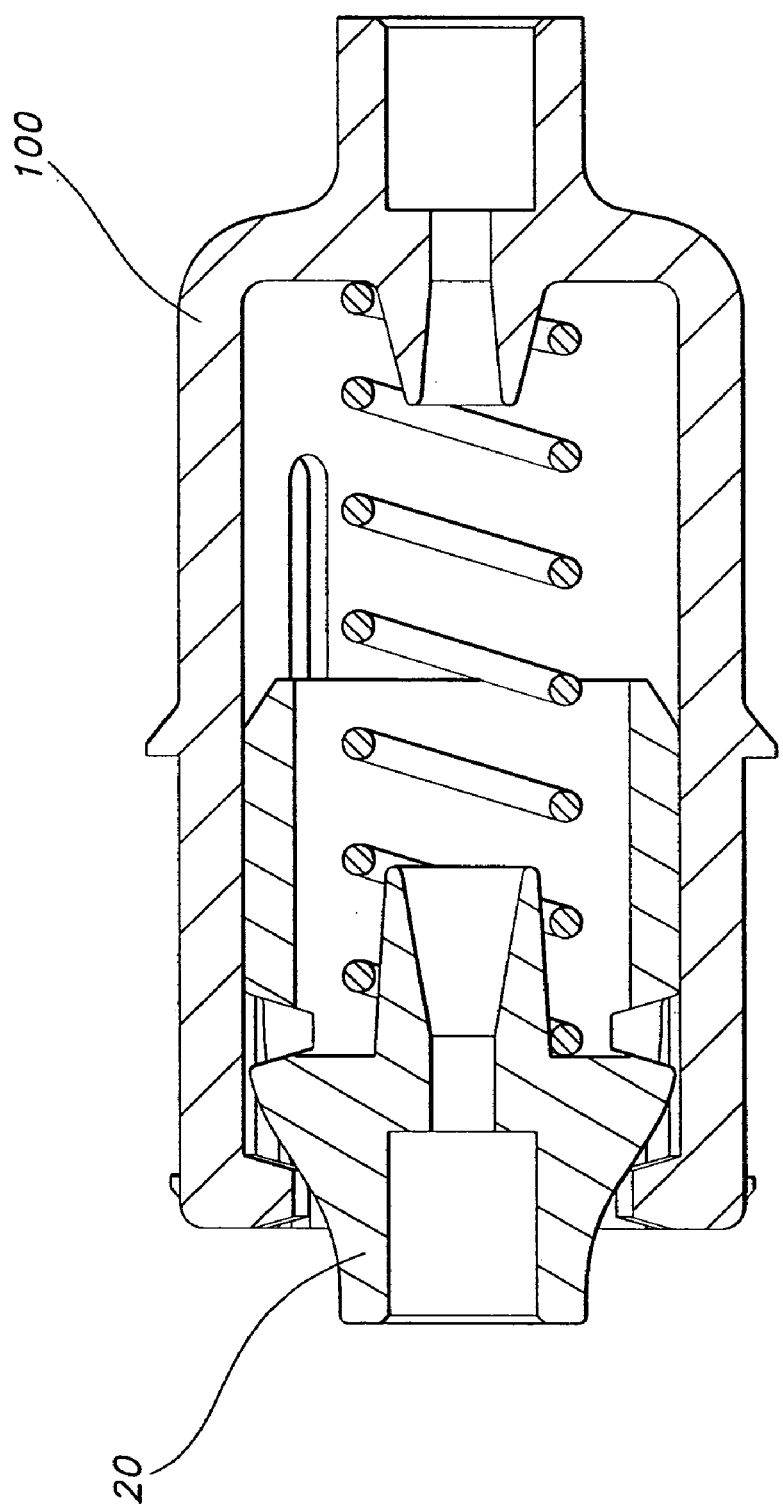
FIG. 7 is a cutaway side view of the mechanical fuse in a compressed position.

In operation, the mechanical fuse remains static in all respects during the normal use of the traction cable to which the fuse is attached. That is, when the forces exerted on the traction cable are within their normal pre-configured range for operation and use of the ergonomic support it actuates, the components of the mechanical fuse do not move relative to one another. The fuse components stay in a first relative position as long as the compressive axial forces remain below the preconfigured threshold. When an abusive load increases beyond the threshold, the friction fit between the bosses/collar and detents/groove releases and the fuse moves to a compressed position as shown in FIG. 7.

When an abusive load is encountered, it will force the end of the wire 24 at the ergonomic support and away from the end of the sleeve 26. This force is applied to the mechanical fuse by a compressive axial force into the assembly through sleeve seat 102 and resisted by the opposing sleeve seat 122. (Obviously, these positions are interchangeable, as the fuse may be equivalently installed in either direction.) In other words, an abusive force in the ergonomic support will be seen by the mechanical fuse as a compressive axial force tending to force first cylindrical component 100 and second cylindrical component 120 towards each other in an axial direction. When this abusive force is applied, it overcomes the force of static friction holding the angled faces 112 of collar 110 against the angled faces 132 of annular groove 130. The natural bias of first cylindrical component's side walls to retain the collar and the groove together, with the force of the compression spring 140, are overcome. The first cylindrical component 100 and second cylindrical component 120 slide towards each other or compress, with a male portion of one, which in the depicting embodiment is component 120, sliding axially into a space designed to receive it in the female component, which in the depicted embodiment is first cylindrical component 100.

By thus moving axially along the axis of the traction cable, the mechanical fuse assembly relieves the load being abusively applied. The relative length of the walls of the first cylindrical component 100 and second cylindrical component 120 may be pre-configured to substantially correspond to the anticipated range of motion of the traction cable for the particular ergonomic support attached to it. They may also be just long enough to relieve an anticipated abusive load.

Clearly, a load is defined as abusive by the degree of force required to move sectioned collar 110 out of annular groove 130. Accordingly, the design of the strength, material, coefficient of friction, and angles of faces 112 and 132 and the strength of compression spring 140 will define the degree of force necessary to move the collar 110 out of the groove 130, thereby also defining the threshold of what constitutes an abusive load.

Adjustment of the overload threshold may be achieved without refabricating the primary components of the fuse, in the depicted embodiments cylindrical components 100 and 120, by adjusting the strength of the C-clamp 140. By using a weaker C-clamp 140 the threshold for overloading and activating the fuse is lowered, and by using a stronger C-clamp the threshold is raised.

In the depicted embodiment the following parameters may be used. The angle of the both faces of collar 112 and groove 132, to the axis of the fuse is between 70 and 80 degrees. The coefficient of friction 0.15 to 0.25 (unlubricated nylon against nylon). The typical triggering force is variable, but for lumbar supports and the components that need protection, it typically will be between 450 and 650 Newtons. The travel until the peak load is reached is in the 1–2 mm range. The total travel must be adjustable and is typically 20 to 60 mm. The reset force, which is determined by the spring constant and spring precompression has to be higher than the cable preload (lumbar in seat with foam and trim, but no occupant), which is typically between 20 and 100 Newtons. The radial forces per finger 200 (with a 4 fingers fuse) is typically in the range of 5 to 15 Newtons.

In order to reset the mechanical fuse, and through it the ergonomic support with which it is assembled, expansion spring 150 exerts a separating force on the first and second cylindrical components 100 and 120. The outer walls 128 of second cylindrical component 120 are angled to accommodate the return path of the expanded collar 110 for resetting into annular groove 130.

Because the abusive load is applied to the mechanical fuse as a compressor force, the mechanical fuse can be deployed for use with rigid linkage components such as rods, spokes or hard drawn wires. In the assembly of such a deployment, the step of inserting a wire 24 through both components 100 and 120 is omitted. Thereafter the step of seating cable sleeves into seats 102 and 122 is replaced by seating rods, spokes or other rigid components in seats 102 and 122. The ends of the rods may be held in place simply by compression, or, in an alternative embodiment, a snap fit, screw, collar or other known fixation device may be used to retain an end of a rod in seats 102 and 122. An alternative embodiment dedicated to use with rigid components may omit through holes 104 and 124. Clearly, however, the depicted embodiment may be used with rigid devices as is.

Figure 6:
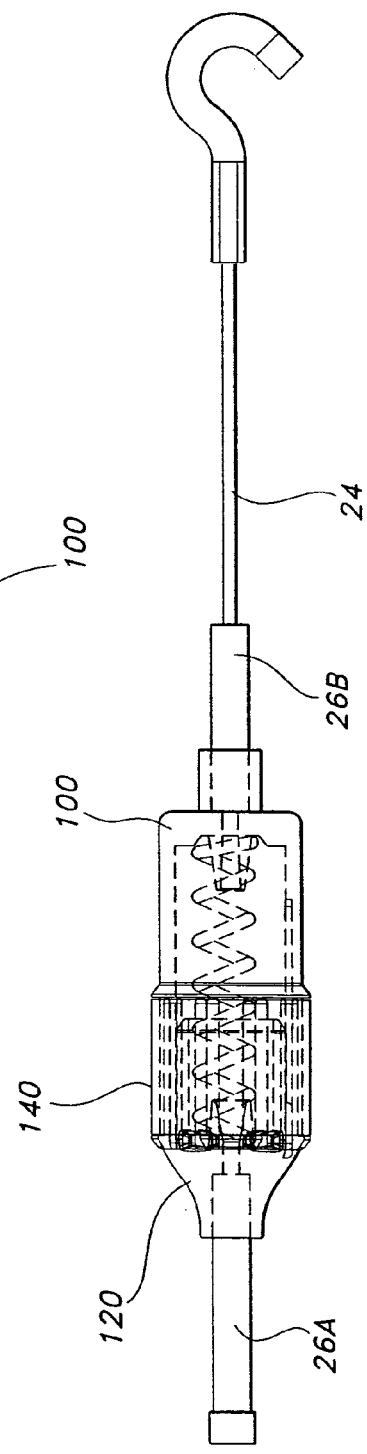
FIG. 6 a side view of the mechanical fuse, installed.

FIG. 6 is a side view of the mechanical fuse installed in series with a traction cable, showing cable sleeve sections 26A and 26B, wire 24, components 100 and 120, external spring 114 and internal spring 150.

In view of the foregoing, it will be seen that the several advantages of the invention are achieved and attained.

The embodiments were chosen and described in order to best explain the principles of the invention and its practical application to thereby enable others skilled in the art to best utilize the invention in various embodiments and with various modifications as are suited to the particular use contemplated.

As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A mechanical fuse for a force transmission linkage comprising:
    a first component having a detent and a seat adapted to receive a first compressive force element;
    a second component having a boss and a seat adapted to receive a second compressive force element;
    a spring disposed between said first component and said second component, said spring being selected from a group consisting of an expansion spring and a compressive spring; and
    a friction fit operatively engaging said boss with said detent, said first component and said second component being secured together in a relative position with respect to each other; wherein said friction fit releases said boss from said detent when an axial compressive force reaches a preconfigured threshold and wherein said first component and said second component move relative to each other from said relative position to a compressed position.

2. The mechanical fuse in claim 1, further comprising an internal expansion spring disposed within and between said first component and said second component such that said internal expansion spring resists compressive forces.

3. The mechanical fuse in claim 1, wherein said bosses are integrally formed on longitudinal fingers, said longitudinal fingers being integrally formed into said second component.

4. The mechanical fuse in claim 1, further comprising a compressive spring being in compressive engagement with said second component such that said compressive spring biases said bosses into said friction fit with said detents.

5. A mechanical fuse for a traction cable comprising:
    a female component having a longitudinal axis and having at least one longitudinal finger integrally formed therewith and having a seat for a first section of a traction cable sleeve and a through-hole for a traction cable wire;
    at least one boss integrally formed with each of said fingers;
    a male component and having the same said longitudinal axis and having at least one detent integrally formed therewith, each of said detents being dimensioned to correspond with each of said bosses, said male component further having a seat for a second section of a traction cable sleeve and a through-hole for the traction cable wire;
    a compressive spring biasing said bosses into a friction fit with said detents; and
    an internal expansion spring disposed within and between said male component and said female component and disposed to bias said male component and said female component apart along said axis;
    wherein said friction fit between said at least one boss and said at least one detent releases upon application to said mechanical fuse of a compressive axial force greater than a preconfigured threshold.

6. The mechanical fuse of claim 5, wherein said internal expansion spring is preconfigured to reset said at least one boss into said friction fit with said at least one detent upon release of compressive axial force after said compressive axial force has exceeded said preconfigured threshold and released said friction fit.

7. The mechanical fuse of claim 5, wherein said bosses have a face at an angle that is non-perpendicular to said axis of said mechanical fuse and said detents have a face at a non-perpendicular angle to said axis of said mechanical fuse wherein said boss face angles and said detent face angles are substantially the same angle such that a friction fit is established between said boss face and said detent face.

8. The mechanical fuse of claim 7, wherein said face of said boss and said face of detent are within a range of about 70 to about 80 degrees from said axis of said mechanical fuse.

9. The mechanical fuse of claim 5, wherein said female component and said male component are plastic.

10. The mechanical fuse of claim 5, wherein said female component and said male component are nylon.

11. The mechanical fuse of claim 5, wherein a co-efficient of friction between said face of said boss and said face of said detent is within a range of about 0.15 to about 0.25.

12. The mechanical fuse of claim 5, wherein said preconfigured threshold for activating said mechanical fuse is in a range from about 450 Newtons to about 650 Newtons.

13. The mechanical fuse of claim 6, wherein a force actuating said reset is in a range of about 20 Newtons to about 100 Newtons.

14. The mechanical fuse of claim 5, wherein an outward radial force on said fingers required to overcome said friction fit is a range of about 5 Newtons to about 15 Newtons.

15. The mechanical fuse of claim 5, wherein a range of travel axially between said female component and said male component necessary to reach said preconfigured threshold of axial compressive force is in the range of about 1 millimeter to about 2 millimeters.

16. The mechanical fuse of claim 5, further comprising:
a traction cable wire proceeding through said mechanical fuse;
a first traction cable sleeve section seated in said seat of said male component; and
a second traction cable sleeve section seated in said seat of said female component.

17. The mechanical fuse of claim 16, wherein said traction cable wire and said traction cable sleeve segments are dimensioned to have a total travel adjustable within a range of about 20 millimeters to about 60 millimeters.

18. The mechanical fuse of claim 5, further comprising a first actuation linkage rod seated in said seat of said male component; and
a second actuation linkage rod seated in said seat of female component.

19. The mechanical fuse for an actuation linkage comprising:
a first component and a second component in operative engagement, said first component and said second component being further adapted for operative engagement with an actuation linkage;
said first component and said second component having a first relative position allowing selective positioning of said actuation linkage, said first relative position remaining unchanged below a preconfigured threshold of axial compressive force; and
said first component and said second component having a compressed position that is axially shorter than said first relative position, said mechanical fuse only moving into said compressed position when a compressive axial force placed on said linkage exceeds said preconfigured threshold.

20. A method of installing a mechanical fuse comprising:
threading a wire of a traction cable through a first component, a spring and a second component;
closing said first component and said second component together, said closing encapsulating said spring such that said spring resists axial compression, said closing being by a snap fit, and said snap fit being adapted to release when an axial compressive force reaches a preconfigured threshold.

21. The method of claim 19, further comprising:
installing an external spring over said first component and said second component, said spring biasing said first component and said second component into said snap fit.

22. The method of claim 21, further comprising: adjusting the strength of said external spring in order to set said preconfigured threshold.

23. The method of claim 19, further comprising installing said mechanical fuse in an actuation linkage for an ergonomic device.

* * * * *